US005909581A

United States Patent [19]

Park

[11] Patent Number: 5,909,581

[45] Date of Patent: Jun. 1, 1999

[54] AUTOMATIC SOFTWARE UPDATING METHOD

[75] Inventor: Seong-Kab Park, Kuri, Rep. of Korea

[73] Assignee: SamSung Electronics Co., Ltd., Suwon, Rep. of Korea

[21] Appl. No.: 08/777,764

[22] Filed: Dec. 30, 1996

[30] Foreign Application Priority Data

Dec. 30, 1995 [KR] Rep. of Korea ...................... 95-69688

[51] Int. Cl.$^{6}$ ...................................................... G06F 9/445

[52] U.S. Cl. ................ 395/712; 395/200.51; 395/200.47

[58] Field of Search ........................... 395/200.1, 200.01, 395/200.09, 800, 685, 619, 610, 712, 491, 200.51; 364/221, 221.28; 379/91, 96

[56] References Cited

U.S. PATENT DOCUMENTS

| | | | |
|---|---|---|---|
| 4,558,413 | 12/1985 | Schmidt et al. | 707/203 |
| 5,008,814 | 4/1991 | Matheur | 395/200.51 |
| 5,155,847 | 10/1992 | Kirouac et al. | 395/200.51 |
| 5,485,370 | 1/1996 | Moss et al. | 395/200.47 |
| 5,495,610 | 2/1996 | Shing et al. | 395/200.51 |
| 5,497,479 | 3/1996 | Hornbuckle | 463/29 |
| 5,619,716 | 4/1997 | Nonaka et al. | 395/712 |

*Primary Examiner*—Majid A. Banankhah
*Attorney, Agent, or Firm*—Robert E. Bushnell, Esq.

[57] ABSTRACT

An automatic software updating method in a communication network including a host computer, a plurality of branch processing computers each connected to the host computer for serving as servers, and a plurality of personal computers connected to a corresponding branch processing computer is provided. The method includes the steps of: (a) uploading a new software together with a version-up table including a version code to the host computer; (b) downloading the version-up table uploaded in step (a) to the branch processing computer; (c) determining whether to download the software using the version code of the version-up table downloaded in step (b); (d) downloading the software according to the result of step (c); and (e) installing the software downloaded in step (d) in the personal computer. Therefore, an out-of-date software of computer systems dispersedly arranged in the network can be automatically updated by a partially corrected or newly developed software.

24 Claims, 3 Drawing Sheets

START

UPLOAD NEW SOFTWARE TO BP — 310

UPLOAD NEW SOFTWARE FROM BP TO HOST — 320

DOWNLOAD VERSION-UP TABLE FROM HOST TO BPs — 330

340 IS VERSION CODE SAME AS PRE-SET CODE VALUE — NO → END

YES

DOWNLOAD AND INSTALL NEW SOFTWARE FROM HOST TO BP. — 350

DOWNLOAD VERSION-UP TABLE FROM BP. TO PC. — 360

370 IS VERSION CODE OF DOWNLOADED VERSION-UP TABLE SAME AS PRE-SET CODE VALUE? — NO

YES

DOWNLOAD AND INSTALL NEW SOFTWARE FROM BPs TO PCs — 380

END

HOST
10
BP
20A
BP
20B
BP
20C
PC
30A
PC
30B
PC
30C
PC
30D
PC
30E
PC
30F

AUTOMATIC SOFTWARE UPDATING METHOD

CLAIM FOR PRIORITY UNDER 35 U.S.C. §119

This application makes reference to, incorporates the same herein, and claims all benefits accruing under 35 U.S.C. §119 from an application for Automatic Software Updating Method earlier filed in the Korean Industrial Property Office on Dec. 30, 1995, and there duly assigned Ser. No. 69688/1995.

BACKGROUND OF THE INVENTION

1. Technical Field

The present invention relates to an automatic software updating method, and more particularly relates to an automatic software updating method for computer systems dispersedly arranged in a communication network.

2. Background Art

Generally, most out-of-date software available in the market today are updated by way of floppy disk distribution, tape distribution and modem support. For example, when an out-of-date software is upgraded for program enhanced features, or a new software which is the most up-to-date version, is needed to be developed, a software manufacturer typically writes an updated version of its software on floppy disks and distribute the disks to all of its customers. This software updating technique is, however, time consuming because the floppy disks are typically distributed via the postal service. In addition, the company personnel are sometimes required to make an on-site visit to update its customers' computer systems. As a result, the costs of labor, on-site visits and floppy disks are unnecessarily incurred. Further, there is a high possibility that new program errors may occur during a manual updating process.

SUMMARY OF THE INVENTION

Accordingly, it is therefore an object of the present invention to provide an automatic software updating method.

It is also an object to provide a method for upgrading out-of-date software by way of a communication network.

These and other objects of the present invention can be achieved by an automatic software updating method for automatically updating out-of-date software of computer systems dispersedly arranged in a communication network, the method comprising the steps of: storing software together with a version-up table containing a version code indicating the version of the software, in a central system; establishing a communication link between one of said plurality of computer systems and said central system; determining whether to download the software using the version code contained in said version-up table installed in the central system, when said one of said plurality of computer system makes a software update request; downloading the software to said one of said plurality of computer systems, when the version code contained in the version-up table installed in the central system indicates a different version from the one previously installed in said one of said plurality of computer systems; and installing the software in said one of said plurality of computer systems after the software is downloaded to said one of said plurality of computer systems.

This automatic software updating method in a communication network including a host computer, a plurality of branch processing computers each connected to the host computer for serving as servers, and a plurality of personal computers connected to each of the branch processing computers includes the steps of: (a) uploading the software together with a version-up table containing a version code to the host computer; (b) downloading the version-up table uploaded in step (a) to the branch processing computers; (c) determining whether to download the software to the branch processing computers using the version code of said version-up table downloaded in step (b); (d) downloading the software to the branch processing computers according to the result of step (c); (e) downloading the version-up table downloaded in the branch processing computers to the personal computers; (f) determining whether to download the software to the personal computers using the version code of the version-up table; and (g) downloading the software downloaded in the branch processing computers to the personal computers according to the result of step (f).

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
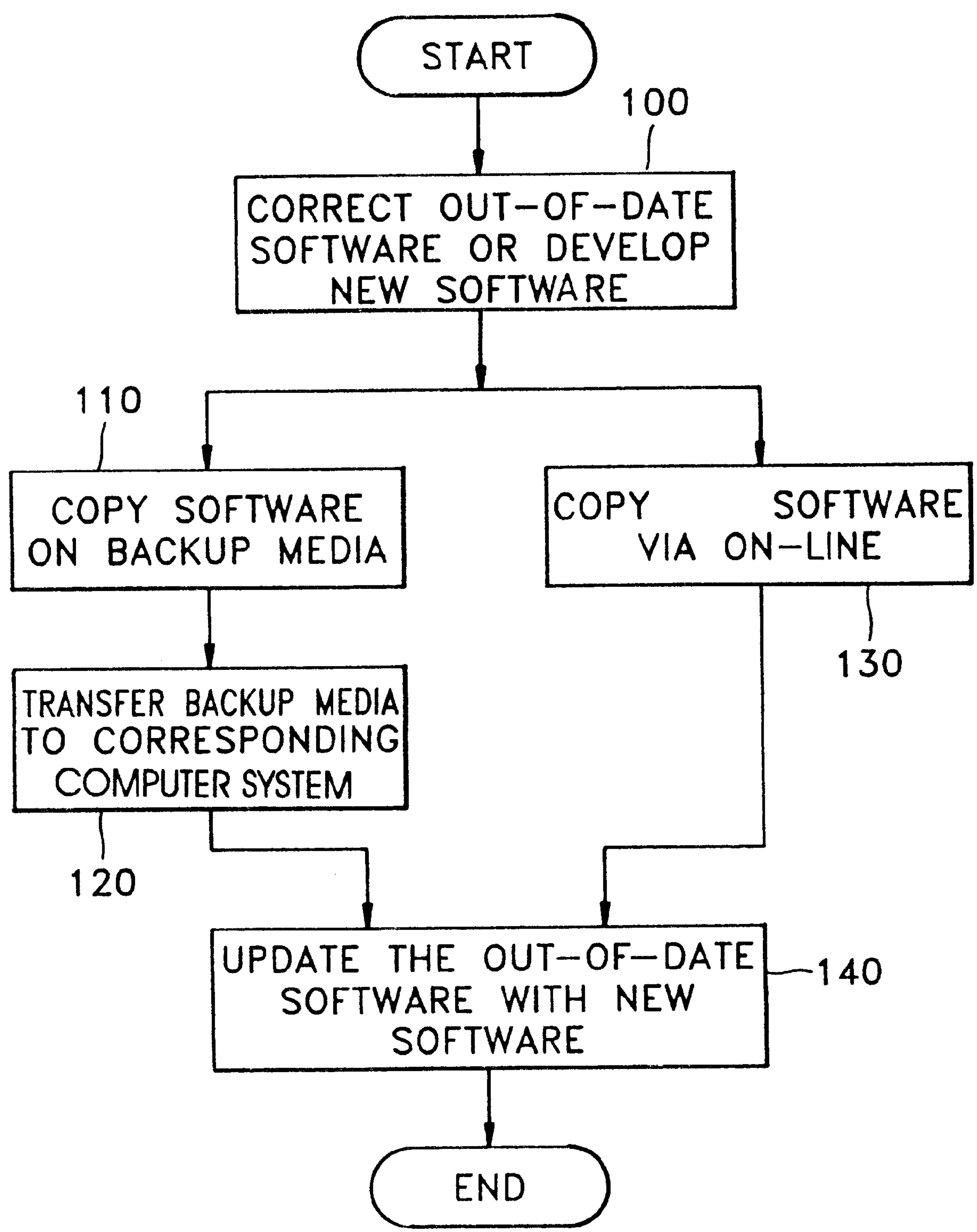
FIG. 1 is an abstract representation of a typical software updating method.

Referring now to the drawings and particularly to FIG. 1, which is an abstract representation of a typical software updating method. As shown in FIG. 1, when an out-of-date software is needed to be corrected for program enhanced features, or a new software which is the most up-to-date version, is needed to be developed, a software programmer typically corrects the out-of-date software or develops new software at step 100. After the out-of-date software is partially corrected or the new version of the same software is obtained, the updating of the out-of-date software may be performed by two techniques. The first technique requires the new software to be copied onto a backup medium at step 110. When the backup medium in which the new software is written is physically transferred to a computer system at step 120, the computer system which operates the out-of-date software is updated by way of the new software contained in the backup medium at step 140. This software updating technique, however, requires company personnel to make an on-site visit to update the computer system. As a result, the costs of labor, official trips and backup medium are unnecessarily incurred. Moreover, the on-site updating process requires a long time to update the out-of-date software. Further, there is a high possibility that errors may occur during a manual updating process.

The second technique requires the computer system's user or customer to call the computer software manufacturer by way of a modem and copy the new software while on-line at step 130. Once the new software is copied via on-line, the out-of-date software is then manually updated with the new software at step 140. This software updating technique is also time consuming, expensive and prone to error because the software updating involves manual processes.

Figure 2:
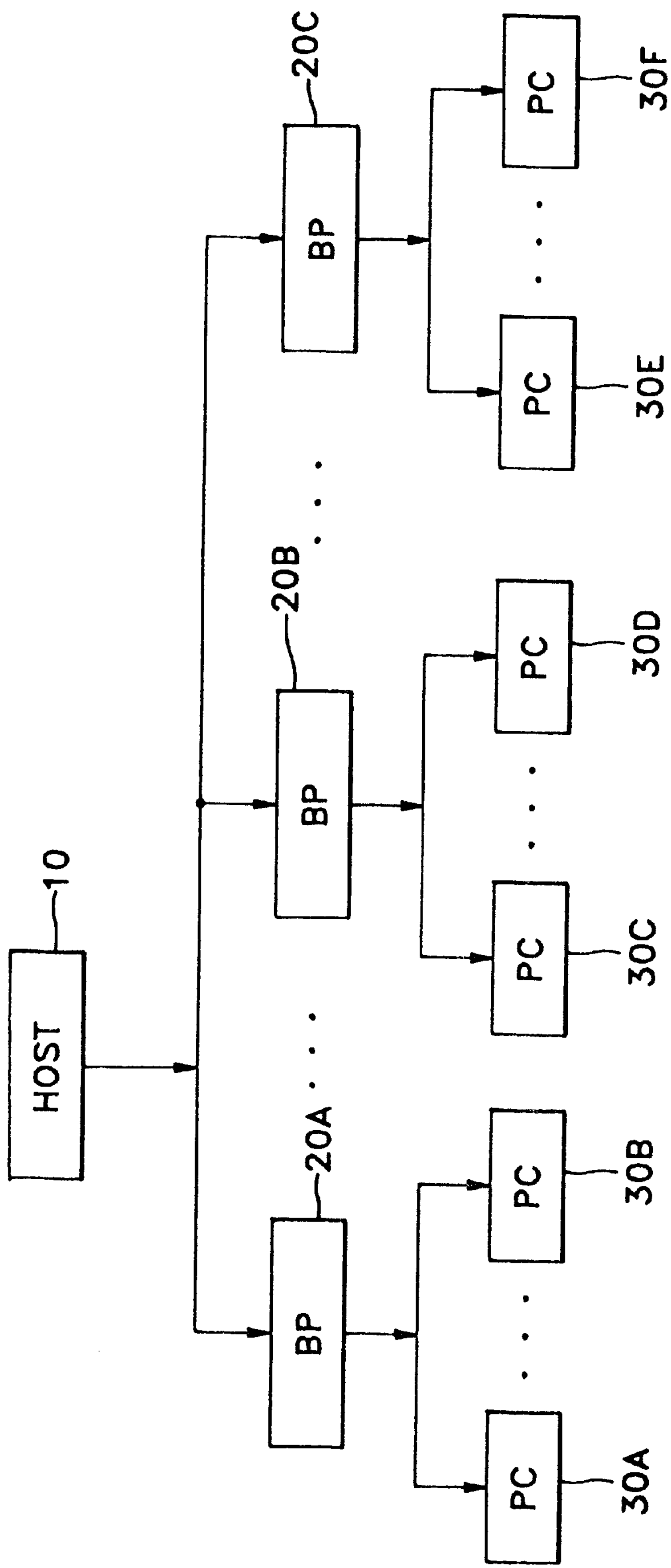
FIG. 2 is a block diagram illustrating the structure of a communication network for performing an automatic software updating method according to the principles of the present invention.

Turning now to FIG. 2, which illustrates the structure of a communication network for performing an automatic software updating method according to the principles of the present invention. The communication network includes a host computer (HOST) 10, a plurality of branch processing computers (BPs) 20A, 20B and 20C each connected to the host computer 10, and a plurality of personal computers (PCs) 30A, 30B, 30C, 30D, 30E and 30F connected to each of the branch processing computers (BPs) 20A, 20B and 20C. Each of the branch processing computers (Bps) 20A, 20B and 20C serves as a server for allowing the personal computers (PCs) connected thereto to update their software. The present invention contemplates upon the transfer of new software to each personal computer (PC) using a file transfer protocol (FTP) of the communication network.

Figure 3:
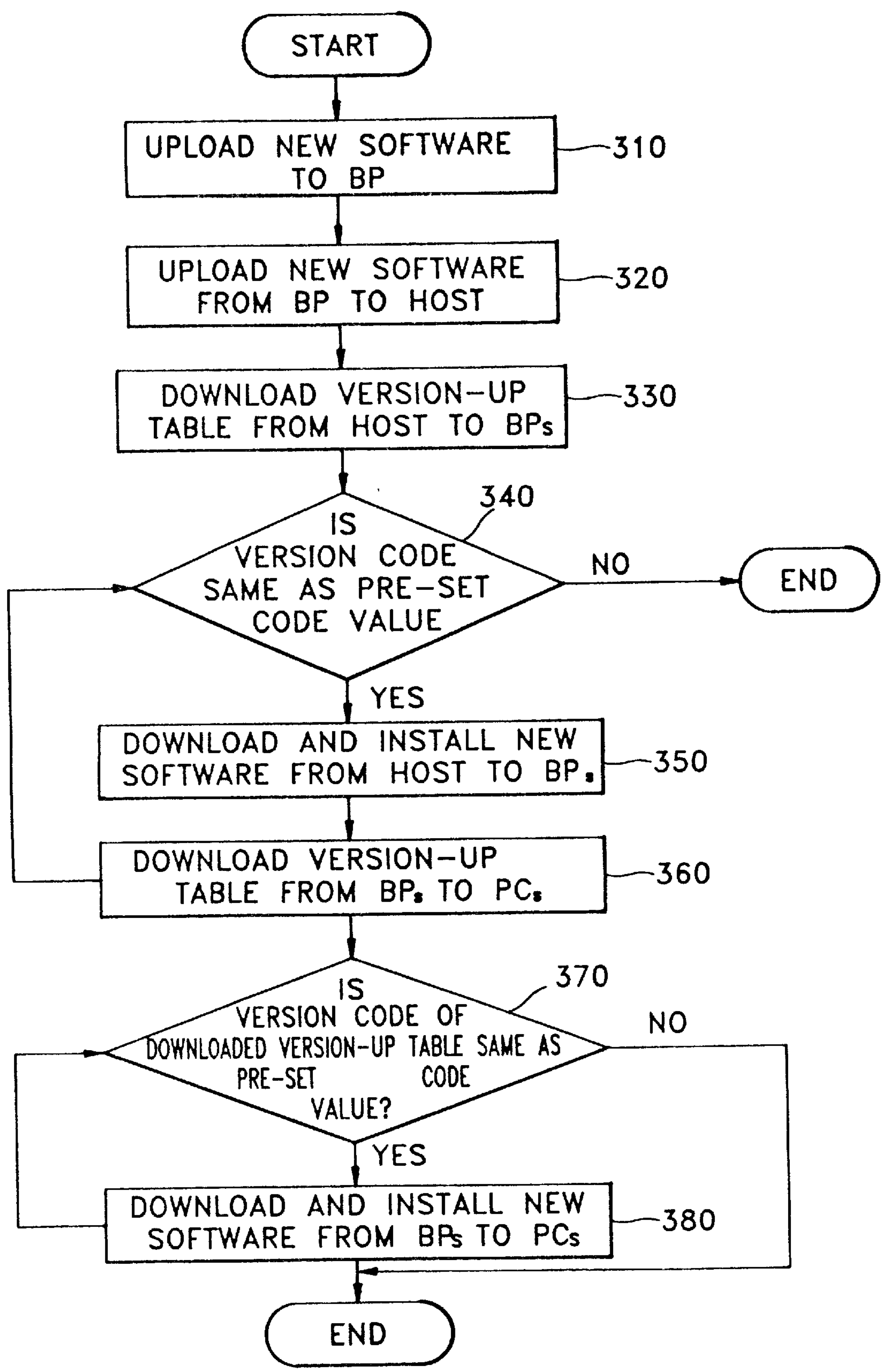
FIG. 3 is a flowchart illustrating an automatic software updating method according to the principles of the present invention.

An automatic software updating method according to the principles of the present invention will now be described with reference to FIGS. 2 and 3.

First, when a programmer corrects an out-of-date software or develops a new software using any one of PCs 30A to 30F, the computer engineer uploads the corrected or newly developed software to the BP 20A which is a server using a file transfer protocol (FTP) at step 310. Here, a version-up table including a system classifying code, a software ID number, a software installation directory, a flag representing a transmission status, and a version code is uploaded together with the new software. The system classifying code is for classifying a system requiring an update by the new software, the software ID number is the number assigned to the software for identifying each software, the software installation directory is a directory under which the new software is installed for the updating process, the flag is information representing the transmission status, and the version code is a code representing the version of the software. In addition, information concerned with the software such as the size and number thereof can be added.

The computer engineer uploads the new software and the version-up table uploaded in the BP 20A to the HOST 10 using the FTP at step 320. When BPs 20B and 20C are automatically connected to the HOST 10 on being initialized, or on a pre-set time, the version-up table uploaded on the host 10 is downloaded to the BPs using the FTP at step 330.

The BPs 20A, 20B and 20C compare the version codes of the downloaded version-up table and the previous version-up table so as to determine whether to download a software. If a new software is developed, there is no previous version-up table. Thus, the version code of the downloaded version-up table is examined to determine if it is the same as a pre-set specific code value to determine whether to download the new software at step 340.

The software is downloaded from the HOST 10 to the BPs 20A, 20B and 20C according to the result of step 340. The BPs 20A, 20B and 20C set a flag of the downloaded version-up table according to the transmission status during the downloading of the software. For example, if the transmission is interrupted during downloading due to a problem in the system, the remaining content of the software can be continuously downloaded with reference to this flag. Here, the BPs 20A, 20B and 20C determine whether to update the out-of-date software of the system with the new software according to the system classifying code of the version-up table. Then, during the updating process, the BPs 20A, 20B and 20C install the new software in the system according to information of the software installation directory of the version-up table at step 350.

When the PCs 30A to 30F are automatically connected to the BPs 20A to 20C on being initialized, or on a pre-set time, the version-up table is downloaded from the BPs 20A, 20B and 20C to the PCs 30A to 30F using the FTP, respectively at step 360.

Since the PCs 30A to 30F do not have a lower system to which the new software is to be transferred, there is no reason to download the software if the updating process is not required. Thus, it is determined whether to update the out-of-date software of the PCs 30A to 30F using the system classifying code of the version-up table. When the updating process is required, the PCs 30A to 30F compare the version codes of the downloaded version-up table and the previous version-up table so as to determine whether to download the software. If a new software is developed, there is no previous version-up table. Thus, the version code of the downloaded version-up table is examined to see if it is the same as a pre-set specific code value to determine whether to receive the new software at step 370.

The software is downloaded from the BPs 20A, 20B and 20C to the PCs 30A to 30F according to the result of step 370. The PCs 30A to 30F set a flag of the downloaded version-up table according to the transmission status during the download of the software. For example, if the transmission is interrupted during the download due to a problem in the system, the remaining content of the software can be continuously downloaded with reference to this flag. Then, the new software is installed in the PCs 30A to 30F according to information of the software installation directory of the version-up table at step 380.

As described above, when an out-of-date software is corrected or a new software is developed, the out-of-date software of the computer systems dispersedly arranged in the communication network can be automatically updated, so that labor and cost are significantly reduced in comparison with the conventional manual method and the time required for installing the new software is sharply reduced. In addition, the new program errors which are commonly associated with the manual updating processes are eliminated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for upgrading out-of-date software in a communication network including a central system and a plurality of branch processing computer systems each connected to said central system for serving as a server, and a different plurality of computer systems each plurality connected to each branch processing computer system, said method comprising the steps of:

installing new software together with a version-up table containing a version code indicating the version of the software, said central system;

establishing communication links between said central system and said plurality of branch processing computer systems, and downloading the new software from said central system to each of the branch processing computer systems;

determining whether to download the new software using the version code contained in said version-up table downloaded in each of the branch processing computer systems, when said one of said plurality of computer systems makes a software update request;

downloading the new software to said one of said plurality of computer systems, when the version code contained in the version-up table installed in the central system indicates a different version from the one previously installed in said one of said plurality of computer systems; and installing the new software in said one of said plurality of computer systems after the new software is downloaded to said one of said plurality of computer systems.

2. The method of claim 1, further comprised of making a comparison between the version code contained in the version-up table downloaded in each of the branch processing computer systems and the version code contained in another version-up table previously installed in said one of said plurality of computer systems.

3. The method of claim 1, further determining that the new software as downloaded to said one of said plurality of computer systems is a new version for upgrading, when the version code contained in the version-up table downloaded in each of the branch processing computer systems differs from the version code contained in another version-up table previously installed in said one of said plurality of computer systems.

4. The method of claim 1, further comprised of said version-up table including a software installation direction for allowing installation of the new software in said one of said plurality of computer systems after the new software is downloaded to said one of said plurality of computer systems.

5. A method for upgrading software in a communication network including a host computer, a plurality of branch processing computer each connected to said host computer, and a plurality of personal computers connected to a branch processing computer, said method comprising the steps of:

(a) installing software together with a version-up table containing a version code, in said host computer;

(b) downloading said version-up table to said branch processing computers;

(c) determining whether to download the software to said branch processing computers using the version code of said version-up table downloaded in step (b);

(d) downloading the software to said branch processing computers according to the result of step (c);

(e) downloading said version-up table downloaded in said branch processing computers to said personal computers;

(f) determining whether to download the software to said personal computers using the version code of said version-up table; and (g) downloading the software downloaded in said branch processing computers to said personal computers for software upgrading according to the result of step (f).

6. The method of claim 5, wherein said steps (c) and (f) are performed by comparing the version code of said version-up table downloaded in step (b) and the version code of a previously downloaded version-up table, when the software is upgraded.

7. The method of claim 5, wherein said steps (c) and (f) are performed by determining whether the version code of said version-up table downloaded in step (b) is the same as a specific code value, when the software is newly developed.

8. The method of claim 5, further installing the software in said branch processing computers and said personal computers according to information of software installation directory included in said version-up table.

9. The method of claim 5, wherein said version-up table further includes flag information and the flag information is set according to a transmission status of the software in step (d).

10. The method of claim 5, wherein said version-up table further includes flag information and the flag information is set according to a transmission status of the software in step (g).

11. The method of claim 9, wherein the software is continuously downloaded according to the setting status of said flag information at the transmission stop.

12. The method of claim 10, wherein the software is continuously downloaded according to the setting status of said flag information at the transmission stop.

13. The method of claim 5, wherein said version-up table further includes information of a system classifying code for classifying a computer system requiring an update of the out-of-date software.

14. The method of claim 5, wherein said version-up table further includes information of a system classifying code for classifying a computer system requiring an update of the out-of-date software, and said step (f) is performed using said version code and said system classifying code.

15. The method of claim 5, wherein said step (b) is performed when said branch processing computers are initiated.

16. The method of claim 5, wherein said step (e) is performed when said personal computers are initiated.

17. A process of upgrading software from a first version to a second version in a communication network including a host computer, a plurality of branch processing computers each connected to said host computer for serving as a server, and a plurality of personal computers connected to each branch processing computers, said process comprising:

installing software of the second version together with a version table containing a version code indicating the version of the software, in the host computer;

when communication links are established between the host computer and the branch processing computers, downloading the version table from the host computer to each of the branch processing computers;

determining whether to download the software of the second version from the host computer to each of the branch processing computers by making a first comparison between the version code contained in the version table downloaded from the host computer and a version code contained in a version table of an existing software;

downloading the software of the second version from the host computer to each of the branch processing computers in dependence upon said first comparison;

when a communication link is established between one of the plurality of personal computers and a corresponding one of the branch processing computers, downloading the version table from said corresponding one of the branch processing computers to said one of the plurality of personal computers;

determining whether to download the software of the second version downloaded from said corresponding one of the branch processing computers by making a second comparison between the version code contained in the version table downloaded from the corresponding one of the branch processing computers and a version code contained in a version table of an existing software;

downloading the software of the second version from the corresponding one of the branch processing computers in dependence upon said second comparison; and installing the software of the second version in lieu of the existing software of the first version in said one of said plurality of personal computers after the software is downloaded to said one of said plurality of personal computers.

18. The process of claim 17, further comprised of said downloading of the software of the second version from the host computer to each of the branch processing computers, when the version code contained in the version table downloaded from the host computer differs from the version code contained in the version table of the existing software.

19. The process of claim 17, further comprised of said downloading of the software of the second version from said corresponding one of the branch processing computers to said one of the personal computers, when the version code contained in the version table downloaded from said corresponding one of the plurality of branch processing computers differs from the version code contained in the version table of the existing software.

20. The process of claim 17, further comprised of the version table downloaded from the host computer including:

a system classifying code for classifying a system which requires an update by the software of the second version;

a software identification code for identifying each software;

a software installation directory code for identifying a directory for which the software of the second version is installed; and a flag for indicating a transmission status of the software.

21. A process of upgrading software from a first version to a second version in a communication network including a host computer, a plurality of servers, and a group of different plurality of personal computers with each group connected to a different server, said process comprising:

uploading, from any one of the personal computers, software of the second version together with a version table containing a version code indicating the version of the software, to a corresponding server using a file transfer protocol;

uploading, from said corresponding server, the software of the second version together with said version table, to host computer using said file transfer protocol;

when communication links are established between the host computer and all servers connected thereto at a predetermined time, downloading the version table from the host computer to each of the servers connected to the host computer using said file transfer protocol;

determining whether to download the software of the second version from the host computer to each of the servers by making a first comparison between the version code contained in the version table downloaded from the host computer and a version code contained in a version table of an existing software;

downloading the software of the second version from the host computer to each of the servers in dependence upon said first comparison;

when a communication link is established between any one of the personal computers and a corresponding server, downloading the version table from said corresponding server to said any one of the personal computers;

determining whether to download the software of the second version downloaded from said corresponding server to said any one of the personal computers by making a second comparison between the version code contained in the version table downloaded from said corresponding serve and a version code contained in a version table of an existing software;

downloading the software of the second version from said corresponding server to said an one of the personal computers in dependence upon said second comparison; and installing the software of the second version in lieu of the existing software of the first version in said any one of the personal computers after the software is downloaded to said any one of said personal computers.

22. The process of claim 21, further comprised of said downloading of the software of the second version from the host computer to each of the servers, when the version code contained in the version table downloaded from the host computer differs from the version code contained in the version table of the existing software.

23. The process of claim 21, further comprised of said downloading of the software of the second version from said corresponding server to said any one of the personal computers, when the version code contained in the version table downloaded from said corresponding server differs from the version code contained in the version table of the existing software.

24. The process of claim 21, further comprised of the version table downloaded from the host computer including:

a system classifying code for classifying a system which requires an update by the software of the second version;

a software identification code for identifying each software;

a software installation directory code for identifying a directory for which the software of the second version is installed; and a flag for indicating a transmission status of the software.

* * * * *